(12) United States Patent
Yamamoto (10) Patent No.: US 7,054,025 B2
(45) Date of Patent: May 30, 2006

(54) PRINTING SYSTEM INVOLVING PRINT PREPARING OPERATION

(75) Inventor: Mika Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/767,009

(22) Filed: Jan. 29, 2004

(65) Prior Publication Data
US 2004/0184081 A1    Sep. 23, 2004

Related U.S. Application Data

(63) Continuation of application No. 09/449,968, filed on Nov. 26, 1999, now abandoned.

(30) Foreign Application Priority Data

Nov. 26, 1998  (JP) ................................ 10-336138

(51) Int. Cl.
G06F 3/12   (2006.01)
G06K 1/00   (2006.01)
(52) U.S. Cl. ..................................... 358/1.15; 358/1.8
(58) Field of Classification Search ......... 358/1.1–1.18
See application file for complete search history.

(56) References Cited

U.S. PATENT DOCUMENTS

| | | | | |
|---|---|---|---|---|
| 5,566,278 A | 10/1996 | Patel et al. | ................. | 395/114 |
| 5,600,793 A | 2/1997 | Nord | ...................... | 295/200.01 |
| 5,803,623 A * | 9/1998 | Iwasaki | ....................... | 400/54 |
| 5,847,729 A | 12/1998 | Takahashi et al. | ............ | 347/43 |
| 5,850,245 A | 12/1998 | Goto et al. | ................. | 347/156 |
| 6,268,925 B1 | 7/2001 | Yamanaka | ................. | 358/1.14 |
| 6,382,764 B1 * | 5/2002 | Shimoda | ..................... | 347/23 |

FOREIGN PATENT DOCUMENTS

| | | |
|---|---|---|
| EP | 750251 | 12/1996 |
| EP | 759590 | 2/1997 |
| EP | 851338 | 7/1998 |
| EP | 923024 | 6/1999 |
| JP | 64-53850 | 3/1989 |
| JP | 9-174963 | 9/1997 |
| JP | 2000-76027 | 3/2000 |

* cited by examiner

*Primary Examiner*—Douglas Q. Tran
(74) *Attorney, Agent, or Firm*—Fitzpatrick, Cella, Harper & Scinto (57) ABSTRACT

An information processing apparatus connectable with an external printer, includes communicating unit for communication with the external printer; notifying unit for notifying the external printer of pre-print notification through the communicating unit when execution of printing is instructed; generating unit for processing, after the notifying unit executes the notification, data to be printed to generate print data; sending unit for the sending the print data generated by the generating unit to the external printer through the communicating unit.

6 Claims, 6 Drawing Sheets

01 PRE-PRINT NOTIFICATION
02 EXECUTION CMND
03 SETTING CMND

PRINTING SYSTEM INVOLVING PRINT PREPARING OPERATION

This application is a continuation of application Ser. No. 09/449,968, filed Nov. 26, 1999, now abandoned, the contents of which is incorporated herein by reference.

FIELD OF THE INVENTION AND RELATED ART

The present invention relates to an information processing apparatus and a printing system which involve a preparatory operation for printing and a control method therefor.

Some types of printers require a predetermined preparatory operation to be executed prior to start of the printing operation.

For example, an ink jet printer is provided with a head cleaning mechanism to prevent dried ink plugs a nozzle. In order to maintain the print quality of the print, a head cleaning operation for head maintenance is carried out at predetermined intervals. The timing of the such a head cleaning operation is automatically determined on the basis of the timing of the start of the printing action of the printer.

Relatively long time is required from the instructions of start of printing by the user to the actual printing action in order to carry out various data processing operation for enabling the actual printing. The above-described head maintenance operation is carried out after the p~int data is converted and supplied into a buffer, thus establishing the condition for the very start of printing.

Therefore, the time to the start of the printing is the time for the data processing plus the cleaning time duration for the head maintenance with the result of long printing time from the printing instruction by the user to the completion of the printing.

Japanese Laid-open Patent Application No. SHO 64-53850 discloses a printing apparatus of an electrophotographic type wherein drum driving is instructed prior to sending of the print data to speed up printing operation. With such a system, the drum can be accelerated concurrently with the pre-process of the printing operation in a printing apparatus such as a print data receiving process.

However, when the time required for acceleration of the drum is longer than the time required for the processing prior to the printing operation, the printing time is still long.

Additionally, the printing apparatus does not do any action while the host apparatus is processing the data to be sent to the printing apparatus, after the host apparatus is instructed for printing by the user, and therefore, the user feels anxiety.

SUMMARY OF THE INVENTION

Accordingly, it is a principal object of the present invention to provide a printing system wherein the printing time from the instructions of the printing by the user to the completion of the printing can be reduced.

It is another object of the present invention to provide a printing system in which the print preparing operation carried out prior to the actual printing operation does not influence the printing time.

According to an aspect of the present invention, there is provided an information processing apparatus connectable with an external printer, comprising: communicating means for communication with said external printer; notifying means for notifying said external printer of pre-print notification through said communicating means when execution of printing is instructed; generating means for processing, after said notifying means executes the notification, data to be printed to generate print data; sending means for said sending the print data generated by said generating means to said external printer through said communicating means.

According to another aspect of the present invention, there is provided a printer comprising: analyzing means for analyzing the signal received from external means; preparation means for executing preparation to be executed prior to printing action when a result of analysis by said analyzing means indicates that signal is instructions of the preparation; printing means for executing, when a result of analysis by said analyzing means indicates that signal is print data, printing process on the basis of the print data.

According to a further aspect of the present invention, there is provided a printing system including an information processing apparatus and an external printer which are communicatably connected through communicating means, comprising: notifying means for effecting pre-print notification to said external printer through said communicating means when execution of printing is instructed; generating means for processing, after the pre-print notification of said notifying means, data to be printed to generate print data; sending means for sending the print data generated by said generating means to said external printer through said communicating means, said external printer including: preparation means for executing, in response to pre-print notification provided by said communicating means, preparation to be executed prior to printing action; and printing means for executing printing process on the basis of print data sent by said sending means.

According to a further aspect of the present invention, there is provided a method of processing printing information to be supplied through communicating means to an external printer, said method comprising: a notification step of notifying said external printer of pre-print notification through said communicating means when execution of printing is instructed; a generating step of processing, after the pre-print notification of said notification step, data to be printed to generate print data; a sending step of sending the print data generated by said generating step to said external printer through said communicating means.

According to a further aspect of the present invention, there is provided a printing method comprising: an analyzing step of analyzing a signal received from outside; a preparation step of executing preparation to be executed prior to printing when the signal is indicative of instructions of preparation prior to the printing as a result of analysis of said analyzing step; and a printing step of execution printing process on the basis of the print data when the signal is indicative of print data.

According to a further aspect of the present invention, there is provided a control method for a printing system including a information processing apparatus and an external printer connectable with each other for communication through communicating means, comprising: a notification step of notifying said external printer of pre-print notification through said communicating means when execution of printing is instructed; a preparation step of executing preparation to be executed prior to printing in said external printer in accordance with the pre-print notification of said notification step; a generating step of processing, after the pre-print notification of said notifying step, data to be printed; a sending step of sending the print data generated by said generating step to said external printer through said communicating means; a printing step of executing printing process in accordance with print data sent by said sending step.

According to a further aspect of the present invention, a memory medium for storing a control program for operating a computer of an information processing apparatus connected through communicating means with an external printer, wherein said control program comprising: a code of a notification process of notifying said external printer of pre-print notification through said communicating means when execution of printing is instructed; a code of a generating process of processing, after the pre-print notification of said notifying process, data to be printed to generate print data; and a code of a sending process of sending the print data generated by said generating process to said external printer through said communicating means.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The description will be made as to preferred embodiments of the present invention in conjunction with the accompanying drawings.

Embodiment 1

Figure 7:
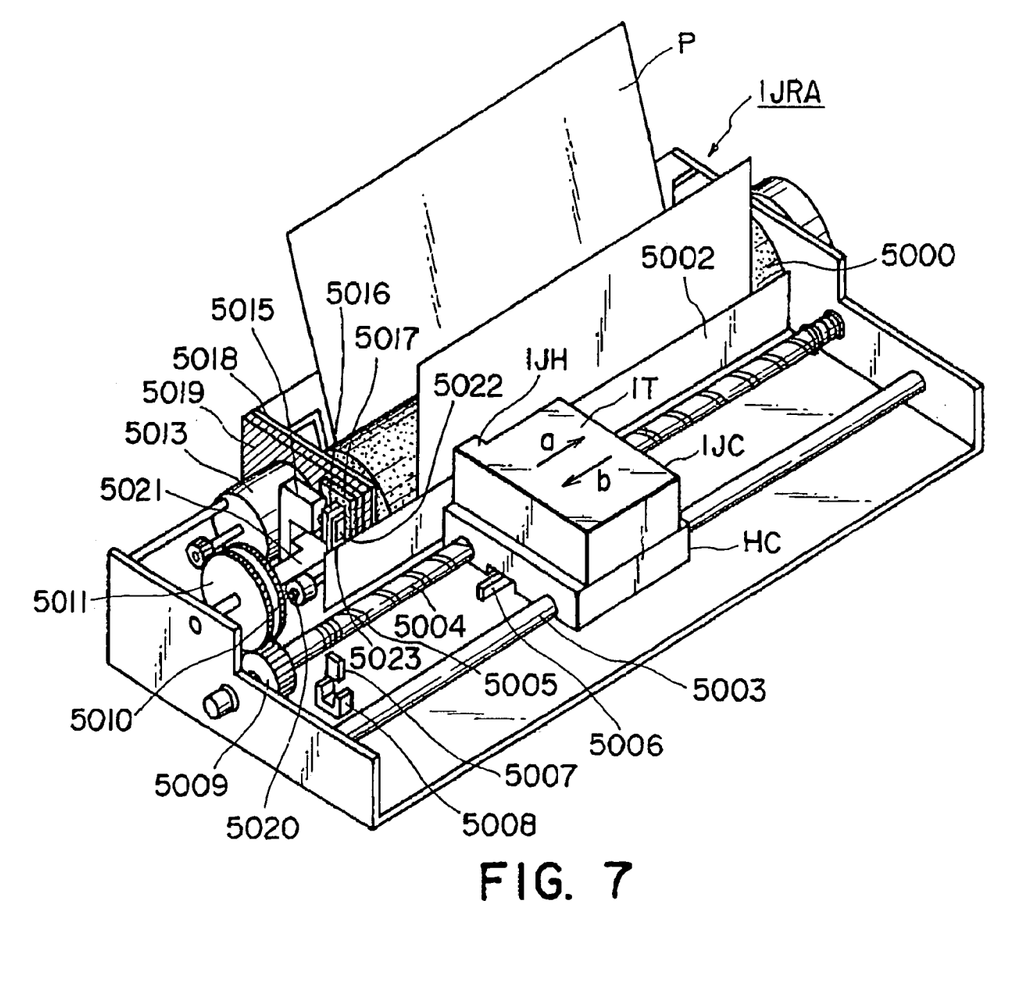
FIG. 7 is a schematic view of an outer appearance of an ink jet recording apparatus according to an embodiment of the present invention.

FIG. 7 is a schematic view of an ink jet recording apparatus according to an embodiment of the present invention. The ink jet recording apparatus will be called hereinafter printer 200.

In FIG. 7, a lead screw 5005 is rotated through driving force transmission gears 5011, 5009 in interrelation with forward and backward rotation of a driving motor 5013. A carriage HC is provided with a pin (unshown) engaged with a spiral groove 5005 of the lead screw 5004. The carriage HC carries an ink jet cartridge IC. Decimated by 5002 is a sheet confining plate to press a sheet against a platen 5000 over a proper distance in the moving direction of the carriage. Elements 5007, 5008 constitute to a photo-sensor functioning as a home position detecting means for detecting presence of the lever 5006 of the carriage to switch the rotational direction of the motor 5013 and so on. Designated by 5016 is a supporting member for supporting a capping member 5022 for capping a front side of the recording head. Decimated by 5015 is suction means for sucking inside of the cap to effect suction recovery of the recording head through a cap opening 5023. Designated by 501 is a cleaning blade more wiping an ejection outlet side surface of the recording head, and 5019 is a member for moving the blade in the front-rear direction. In this embodiment, they are supported on a main assembly supporting plate 5018. Any other known cleaning blades are usable in place thereof. Designated by 5021 is a lever for starting sucking operation of the suction recovery system, and it moves with the movement of the cam 5020 engaged with the carriage under the control of a known transmitting means such as a clutch mechanism for controlling the transmission of the driving force from the driving motor.

The capping, wiping and suction recovery actions are so constructed that when the carriage comes to a predetermined region adjacent the home position, they are operated by the lead screw 5004.

Figure 1:
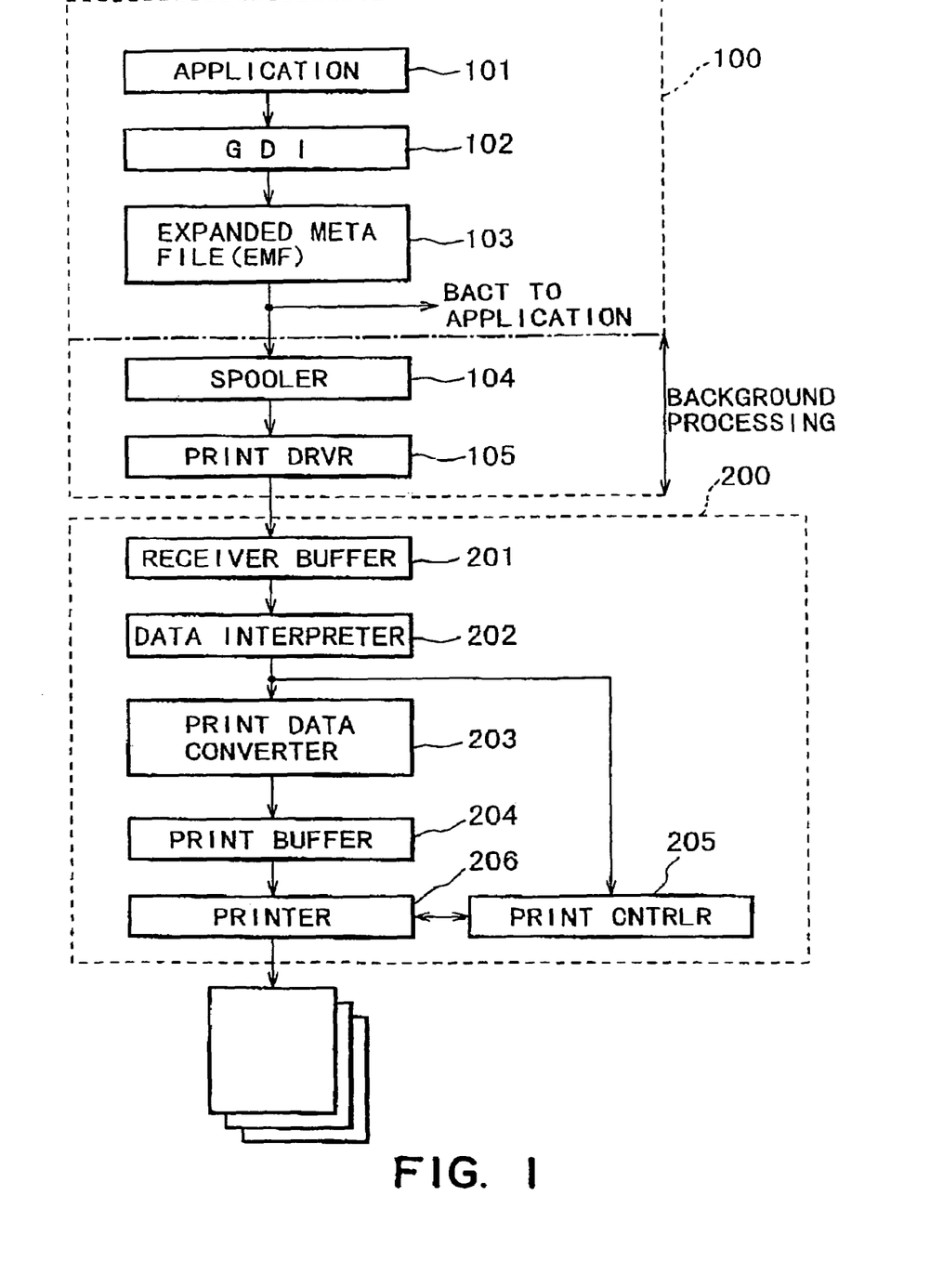
FIG. 1 illustrates a flow of a process from instructions of execution of printing in an application by a user to actual printing operation.

The description will be made as to the flow of processing from the instructions of the extension of printing in an application by the user to the actual printing action, referring to FIG. 1.

In the case that host 100 is a Windows95 (trademark) system, when the printing is instructed, the application 101 requests device context (DC) to GGDIGraphocalk/Devicek/Interface) 102 using the File ( ) API (Application Programming Insterface) and produce an extended meta file (EMF) 103. The thus produced extended meta file 103 is interpreted by a spooler 104, and is sent to a printer driver 105 as a printing job. The printer driver 105 carries out color processing, rasterization, binarization and so on the convert the extended meta file 103 to printer command which is then send to the printer 200.

The printer 200 stores the data supplied from the host 100 in a receive buffer 201 through an interface in the form of a parallel cable or the like. The data interpreter 202 takes the data out of the receive buffer 201 and interprets the data, and send the data to the respective processors. When the data are print data, the data are sent to a print data development portion 203 and are converted to image data. The converted image data are stored in a printing buffer 204, and when a band of the data enough for one can is stored, the printing portion 206 starts sheet feeding and printing operations. On the other hand, when the data are control command, the data are sent to a printer controller 205 to control various parts of the printing portion 206.

The printer 200 of the type shown in FIG. 7 requires head cleaning operation at regular intervals in order to maintain the head performance and therefore the print quality. Usually, in the external printer 200, a timer is referred to for the purpose of the head maintenance at the time when an amount of the image data necessary for one for this can is stored in the printing buffer 20, that is, at the timing of start of the printing operation, and the pre-process operation such as head cleaning is carried out as decided.

Figure 2:
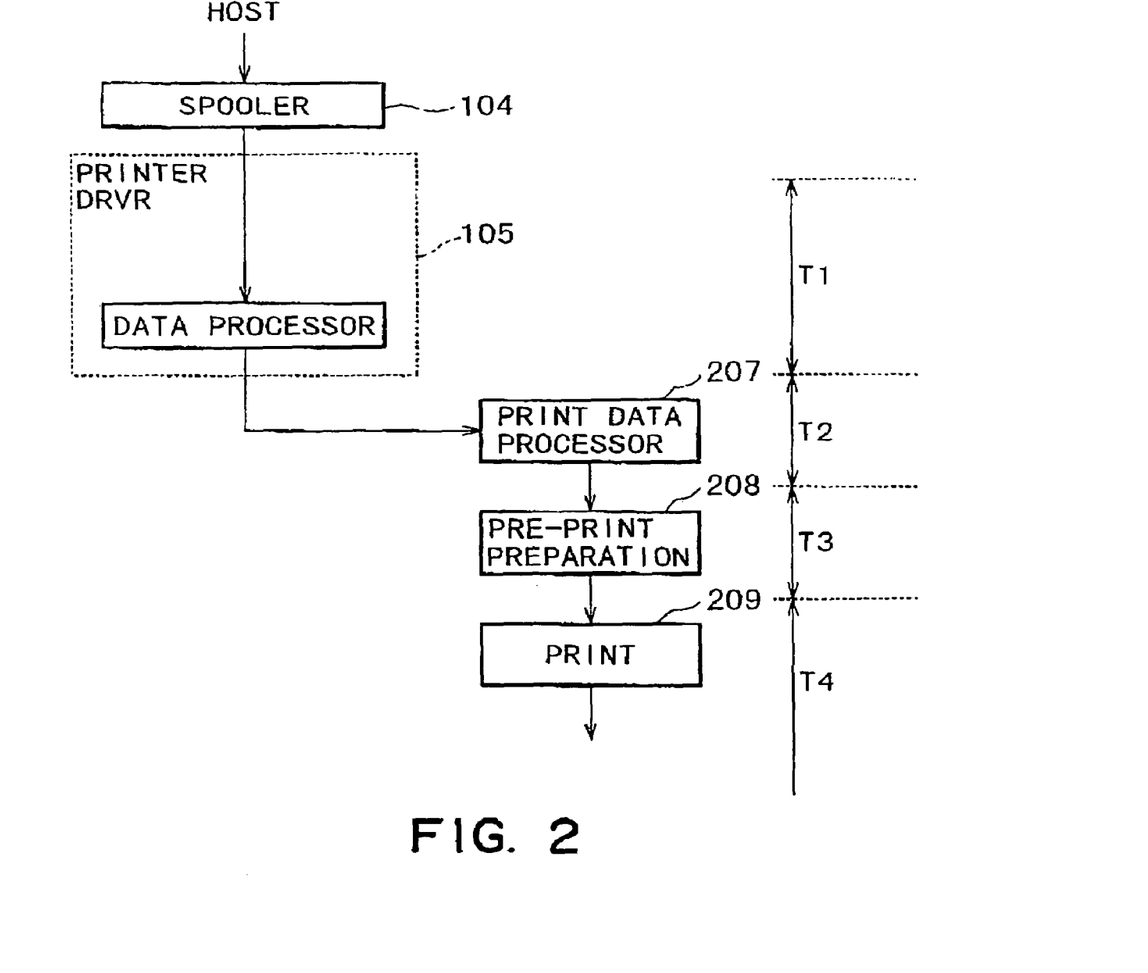
FIG. 2 illustrates printing process time in a conventional example.

FIG. 2 shows printing process time when the pre-print processing is carried out at the conventional print start timing. In an ordinary printing process, at the table when the image data processed by the print data processing portion 207 (receive buffer 201-printing buffer 204 in Figure I) is stored in the printing buffer, that is, at the time of start of printing operation, the pre-print preparation 208 such as cleaning operation is carried out. Therefore, as shown in FIG. 2, the time T3 for the pre-print preparation is simply added to the printing duration, and the time T from the reception of the data by the printer driver to the completion of the printing operation by the printer is $$T=TI+T2+T3+T4.$$

where TI is a length of processing time of the printer driver 105, T2 is a length of processing time of the print data processing portion 207, and T4 is a length of printing time.

It has been noted that printer does not carry out any action for the period of time TI in which the printer driver 105 executes the data processing. According to an aspect of the present invention, the pre-print preparation such as cleaning is carried out utilizing the time period, by which the length of time T3 can be shortened.

Figure 3:
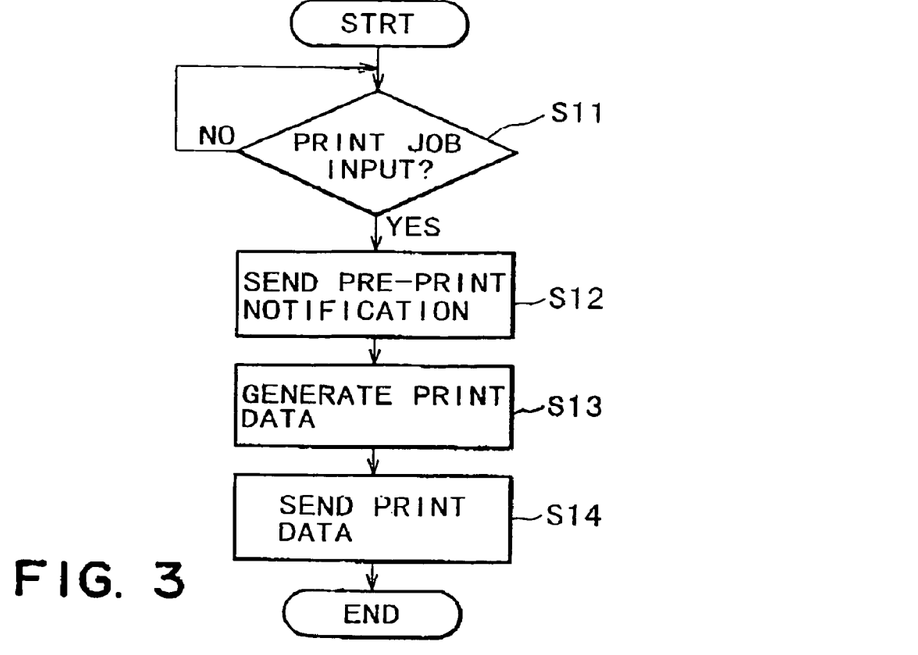
FIG. 3 is a flow chart illustrating process steps carried out by a printer driver according to one embodiment of the present invention.

FIG. 3 is a flow chart illustrating process steps of a printer driver according to an embodiment of the present invention. In step s11, the printing job is supplied from the application 101 through the spooler 104, and then the process goes to step s12 where a pre-print notification is sent to the printer 200. The printer 200 having received in the pre-print notification executes the pre-print preparation (a flow chart of FIG. 4 which will be described hereinafter).

Then, in step s13, various data processing operations are carried out for the printing job to produce print data. At step s14, the thus produced printing data our center to the printer 200.

Figure 4:
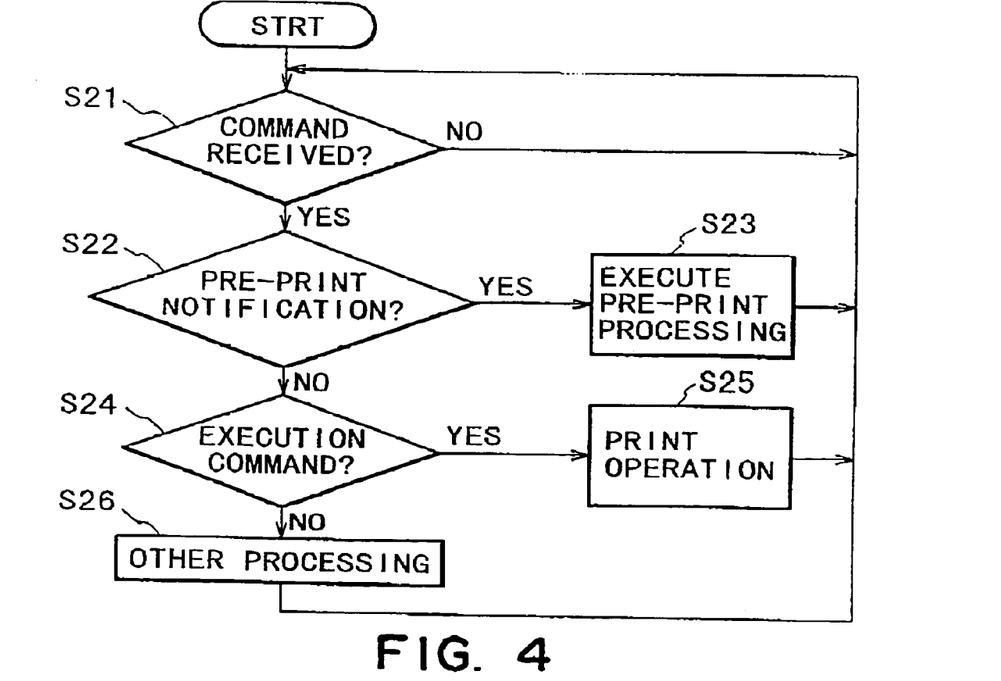
FIG. 4 is a flow chart illustrating operations in a printer according to an embodiment of the present invention.
Figure 5:
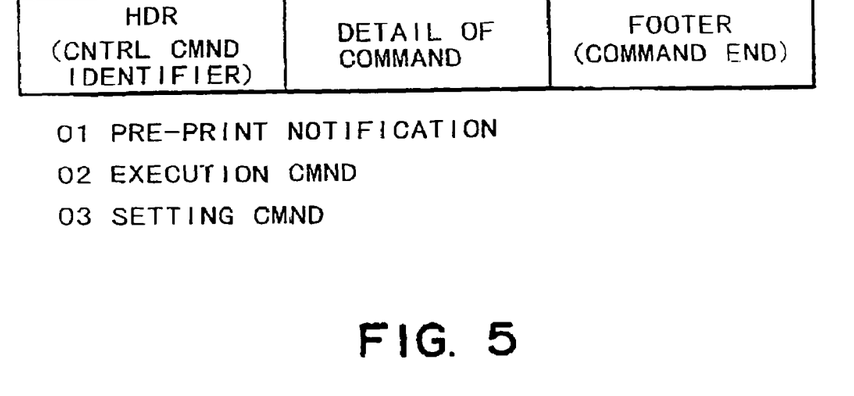
FIG. 5 illustrates a type of a series of command employed in this embodiment.

FIG. 4 is a flow chart illustrating process of operations in the printer according to the embodiment of the present invention. At step s21, the discrimination is made as to whether to receive the command from the host computer 100. The command received from the host computer 100 is in the form shown in FIG. 5, and therefore, it can be discriminated whether it is a pre-print notification or a printing execution command by the header (control command identifier) of the command.

More particularly, the header (control command identifier) 01 is indicative of the pre-print notification in embodiment. The data interpreter 202 of the printer shown in FIG. 2 discriminates the received series of command, and supplies the corresponding command to the printer controller 205. In this embodiment, "02" is indicative of execution command including print data for the like, and "03" is indicative of setting command for a sheet feeding cassette or like.

When the pre-print notification command is received at step s12 in FIG. 3, the command has a header (01) indicative of the pre-print notification. Therefore, the printer recognizes it as a pre-print notification command by the header, and therefore, the process goes from step s22 to step s23 to carry out pre-print preparation.

The command sent with the print data at step s14 is a execution command, so that when it is received, the process goes from step s24 to step s25, by which the printing operation is executed.

If the received the command is neither of the above, the process proceeds to step s26 to execute the process corresponding to the command.

Figure 6:
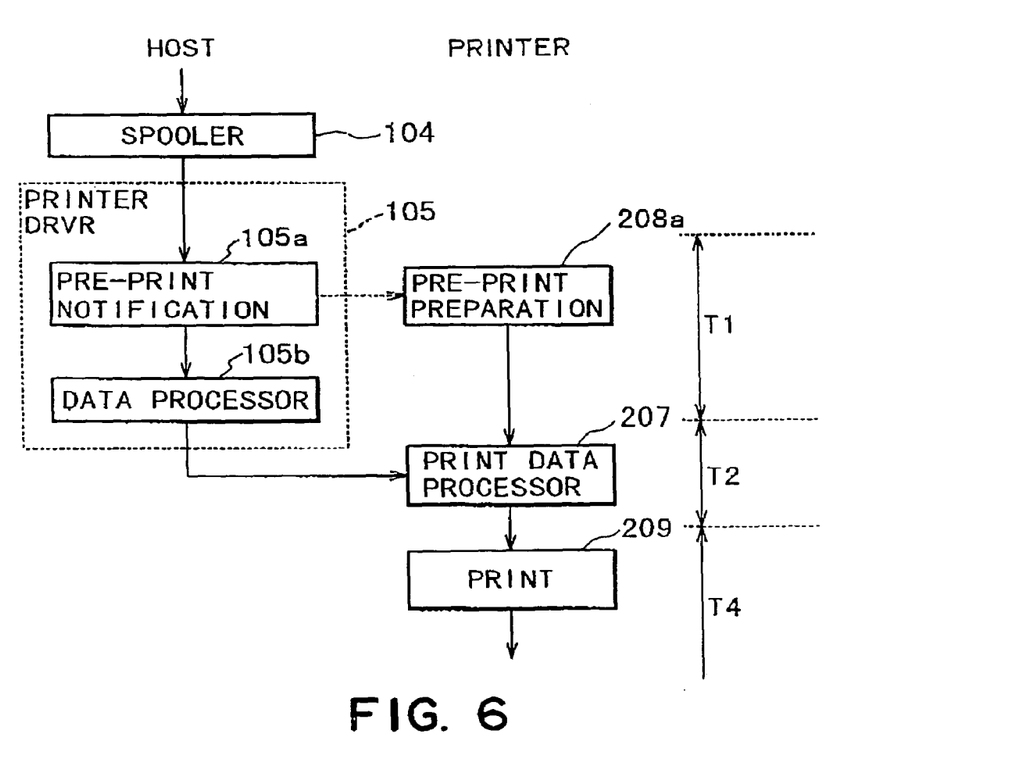
FIG. 6 illustrates printing process time duration according to an embodiment of the present invention.

In this embodiment, the printing process is carried out as shown in FIG. 6 under the above described control. As described above, the printer driver 105 is provided with the pre-print notifying portion 105a and the data processor 105b, and the pre-print notifying portion 105a send the pre-print notification to the printer 200 at the time when it receives the printing job (812, in FIG. 3).

On the other hand, the printer 200 having received in the notification, carries out the preparation 208a before the start of the printing operation to place the printer in condition for immediate start of the printing operation when it receives the print data (s22 and s23, in FIG. 4).

Because of the flow of the process shown in FIG. 6, the time T3 for the pre-print preparation 208a is within the time T1 for the print data processing (generally, the required time for the pre-print preparation is shorter than the data processing duration executed by the data processor 105b in the printer driver 105). Therefore, the time period T from the reception of the data by the printer driver to the completion of the printing operation of the printer is $$T=TI+T2+T4.$$

Figure 8:
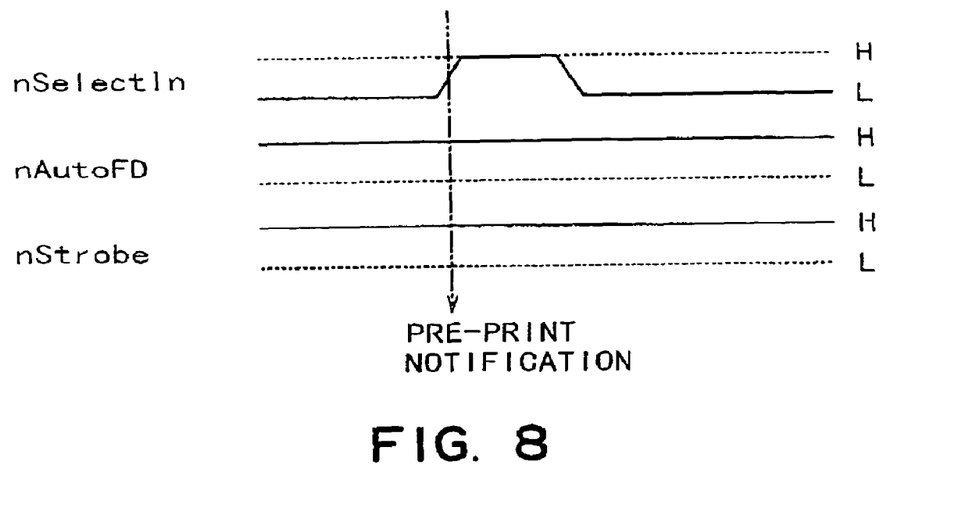
FIG. 8 shows an example of a pre-print notification using a Centronics signal which is an ordinary interface signal.

In this embodiment, the description has been made as to an example in which the means for sending the pre-print notification uses command sending, but the present invention is not limited to this example, and the use can be made with an interface signal. For example, as shown in FIG. 8, the nSelectIn of Centronics signal is used such that nSelectIn which is at a High level is indicative of the pre-print notification. At this time, other signal line exhibits no change. The printer receiving the High of the nSelectIn starts the pre-print preparation. The pre-print notification can be accomplished using another signal line or a plurality of signal lines.

In this embodiment, the ink jet printer is taken as an exemplary printer in which the pre-print preparation is the cleaning process as an example, but the present invention is applicable to a printer of another type. For example, in the case of an electrophotographic type printer, the heat-up operation of the fixing device may be the object of the pre-print preparation, by which the printing duration shortened. Alternatively, the acceleration of the drum rotation may be the object of the pre-print preparation.

As described in the foregoing, according to the present invention, the pre-print notification is sent to the printer prior to the processing of the data received from the spooler by the printer driver. In response to the notification, the printer carries out a process other than the printing action (pre-print preparation) such as printing head maintenance or like using the time period in which the printer driver is processing of the data.

Accordingly, the preparatory operation for printing operation which has been sequentially carried out prior to the printing operation by the printer, can be executed concurrently with the data processing operation being executed by the printer driver, so that printing time shortened. For example, the head cleaning operation or the like for the printing head maintenance which has been carried out immediately before the printing operation in the prior art, is carried out simultaneously with the production of the print data by the printer driver, so that total period of time required for the printing can be shortened.

The present invention is applicable to the system including a plurality of devices (a host computer, interface equipment, a reader, a printer and so on) or to a single device (a copying machine, facsimile machine or the like).

The interface is not limited to the above described parallel cable, but made in network connection such as LAV, and the communication may be wire type or wireless type.

In an embodiment of the present invention, a memory medium storing program code of software accomplishing the function described above is loaded into the system or device, by which the computer (CPU or MPu) of the system or the device reads out the program code stored in the memory medium to execute the program.

In this case, the program code per se read out from the memory medium accomplishes the function of the above described embodiment, and therefore, the memory medium storing the program code constitutes the present invention.

The memory medium for supplying the program code may be a floppy disk, a hard disk, an optical disk, a magneto-optical disk, a CD-ROM, CD-R, magnetic tape, a non-volatile memory memory card, ROM or the like. By executing the program code read out by the computer, the above-described functions may be carried out.

Alternatively a part or all of the actual processing may be executed by the OS (operating system) which is working in the computer, and then, on the basis of the processing of the OS, the above-described functions may be carried out.

Further alternatively, the program code read out of the memory medium is written in memory provided in a function expanding board inserted in the computer or a function expanding unit connected with the computer, and then a part or all of the actual processing is carried out by the CPU or the like provided in the function expanding board or the function expanding unit in accordance with the instructions of the program code to effect the above-described functions.

As described in the foregoing, according to the present invention, the preparatory operation or operations to be executed prior to the start of the actual printing operation can be executed concurrently or in parallelism with the data processing for the printing, so that total printing speed is increased.

While the invention has been described with reference to the structures disclosed herein, it is not confined to the details set forth and this application is intended to cover such modifications or changes as may come within the purposes of the improvements or the scope of the following claims.

What is claimed is:

1. A printer for printing on a recording material using a printing head which ejects ink, said printer being communicably connectable with an information processing apparatus through communication means from which one or more commands are received, said printer comprising:
   analyzing means for analyzing the command received from the information processing apparatus;
   discriminating means for discriminating whether a cleaning operation is necessary before a printing operation, when analysis by said analyzing means indicates that the command is a notification of preparation before printing;
   preparation means for effecting the cleaning operation for the printing head prior to the printing operation when analysis by said analyzing means indicates that the command is a notification of preparation before printing and discrimination by said discriminating means indicates that the cleaning operation is necessary; and
   printing means for executing, when analysis by said analyzing means indicates that the command is print data, the printing operation on the basis of the print data.

2. A printer according to claim 1, wherein the command is an interface signal exchanged with the information processing apparatus.

3. A printer according to claim 1, wherein said preparation means effects suction recovery of said printing head.

4. A printing system comprising a printer for printing on a recording material using a printing head which ejects ink, an information processing apparatus, and communication means for communicably connecting said printer and said information processing apparatus, said printing system further comprising:
   notifying means for sending a command for notifying said printer of a preparation before printing through said communicating means;
   generating means for processing, after the preparation before printing notification of said notifying means, data to be printed to generate print data;
   wherein said printer includes:
   analyzing means for analyzing the command received from the information processing apparatus;
   discriminating means for discriminating whether a cleaning operation is necessary before a printing operation, when analysis by said analyzing means indicates that the command is a notification of preparation before printing;
   preparation means for effecting the cleaning operation for the printing head prior to the printing operation when analysis by said analyzing means indicates that the command is a notification of preparation before printing and discrimination by said discriminating means indicates that the cleaning operation is necessary; and
   printing means for executing, when analysis by said analyzing means indicates that the command is print data, the printing operation on the basis of the print data.

5. A printing method for printing by a printer on a recording material using a printing head which ejects ink, said printer being communicably connectable with an information processing apparatus through communication means from which one or more commands are received, said method comprising:
   an analyzing step of analyzing the command received from the information processing apparatus;
   a discriminating step of discriminating whether a cleaning operation is necessary before a printing operation, when analysis by said analyzing step indicates that the command is a notification of a preparation before printing;
   a preparation step of effecting the cleaning operation for the printing head prior to the printing operation when analysis of said analyzing step indicates that the command is a notification of preparation before printing and discrimination by said discriminating means indicates that the cleaning operation is necessary; and
   a printing step of executing, when analysis of said analyzing step indicates that the command is print data, the printing operation on the basis of the print data.

6. A control method for a printing system comprising a printer for printing on a recording material using a printing head which ejects ink, an information processing apparatus, and communicating means for communicably connecting said printer and said information processing apparatus, said method comprising:
   a notification step of sending a command for notifying said printer of a preparation before printing through said communicating means;
   an analyzing step for analyzing the command received from the information processing apparatus;
   a discriminating step for discriminating whether a cleaning operation is necessary before a printing operation, when analysis by said analyzing step indicates that the command is a notification of preparation before printing;

a preparation step for effecting the cleaning operation for the printing head prior to the printing operation when analysis by said analyzing step indicates that the command is a notification of preparation before printing and discrimination by said discriminating step indicates that the cleaning operation is necessary;

a generating step of processing, after the notification of said notifying step, data to be printed;

a sending step of sending the print data generated by said generating step to said printer through said communicating means; and a printing step of executing the printing operation in accordance with print data sent by said sending step.

* * * * *